Patented Sept. 21, 1948

2,449,879

UNITED STATES PATENT OFFICE 2,449,879

SYNTHETIC RUBBER RECLAIMED WITH A RECLAIMING OIL COMPOSED OF SOLVENT NAPHTHA AND AN AROMATIC HYDROCARBON OIL

Frank W. Corkery, Crafton, Pa., assignor to Pennsylvania Industrial Chemical Corporation, Clairton, Pa., a corporation of Pennsylvania No Drawing. Application February 26, 1944, Serial No. 524,070

12 Claims. (Cl. 260—33.6)

1

This invention relates to a reclaiming oil for rubber, synthetic rubber, and other elastomers. This is a continuation-in-part of my application Serial No. 479,226, filed March 15, 1943, now abandoned.

In one step of processes for reclaiming natural rubber, the rubber stock cut and ground into small pieces and mechanically treated to remove fibrous material, is subjected to heat and pressure in the presence of an oil having such action on the rubber that it serves to penetrate and swell it. An alkaline solution, such as sodium hydroxide dissolved in water, frequently is used to break down any remaining fabric and reduce the percentage of sulphur in the rubber.

Following such digestion, or similar treatment, the treated rubber is subjected to further processing. The subsequent steps of the reclaiming process may include blowing down, removing caustic solution by pressure washing with water and steam, and evaporative drying, or substantially equivalent process steps. The reclaim rubber is then worked on rubber mills, and sheeted. The use of a reclaiming oil, for softening and swelling the rubber, is an essential feature of most rubber-reclaiming processes as currently performed, and the nature and effectiveness of such oil is a matter of importance. Thus it is of importance that the oil possess such solvent action on the rubber, and the ability to exert such softening effect thereon that moisture and alkali, if used, may act effectively on the rubber stock, and that the oil itself may act effectively on the rubber.

It has been the experience of the art in rubber reclaiming that any rubber-reclaiming oil which serves merely to penetrate and swell the rubber is inadequate to produce a satisfactory reclaim stock. Whereas volatile liquids of high solvent power possess the property of penetrating the rubber and swelling it, they lack plasticizing properties. The tendency is, therefore, for an oil, such as refined solvent naphtha, having high solvent power and negligible plasticizing properties, to give a rubber stock too dry and friable satisfactorily to be worked. A proper balance of penetrating and swelling properties with plasticizing properties in a rubber-reclaiming oil is not commonly attained; and the higher the oil may be in ability to penetrate and swell the rubber, coupled with capacity suitably to soften the rubber into a

2 coherent workable mass, the better the reclaiming oil may be considered to be.

The same characteristic properties which are definitive of a satisfactory reclaiming oil for natural rubber must be present in enhanced order in a wholly satisfactory reclaiming oil for synthetic rubber, such as the synthetic rubbers composed of the copolymers of butadiene and acrylic-nitrile currently exemplified by the synthetic rubber "Buna N," and the synthetic rubbers composed of the copolymers of butadiene and styrene currently exemplified by the synthetic rubber "Buna S." These synthetic rubbers (and this is particularly true in the case of the synthetic rubbers composed of the copolymers of butadiene and acrylic-nitrile) present greater resistance to penetration and swelling by a rubber-reclaiming oil than does natural rubber. Also possessing resistance to working greater than that of natural rubber (and this again is particularly true of the synthetic rubber composed of the copolymers of butadiene and acrylic-nitrile), their plasticizing requirements are more exacting than those of natural rubber.

I have invented a novel rubber-reclaiming oil which so combines plasticizing properties with ability to penetrate and swell elastomers that it is usable with satisfaction not only in the reclaiming of natural rubber, but is satisfactory also in the reclaiming of the synthetic rubbers having polymer sizes higher than those of natural rubber, being able to penetrate and swell such stock to be reclaimed and to soften and plasticize the reclaim stock for milling and sheeting operations.

Generally to describe the rubber-reclaiming oil of my invention, it is composed of crude solvent naphtha and of an aromatic oil of coke oven light oil type boiling above 200° C., within the approximate range of 220° C. to 350° C., and possessing high solvent power. Such relatively non-volatile aromatic oil is disclosed as a plasticizer for synthetic rubbers composed of the copolymers of butadiene and acrylic-nitrile, and other elastomers, in my companion application Serial No. 524,069, filed Feb. 26, 1944.

The solvent power of pure coumarone-indene dimers, which have an aniline point of about 26° C. to 27° C., is not high, and is insufficient to render them usable as the plasticizing content of a satisfactory reclaiming oil for butadiene-acrylicnitrile synthetic rubbers. Coumarone-indene dimers, which form an oil popularly known as coumarone-indene dipolymer oil, represent the lowest stage of polymerization of coumarone and indene.

Coumarone and indene are constituents of the material known as coke oven light oil, which comes over before tar in the by-product coking of coal, and which may be fractionated before or after purification into benzol, toluol, xylol, or light solvent naphtha, and heavy solvent naphtha which upon purification gives high-flash solvent naphtha. The light oil as it comes from the by-product oven is a vapor which is collected by counter-flow in a petroleum cut known as "wash oil," and from which "wash oil" it is recovered by distillation in what is known as "crude" stills. In order to purify this coke oven light oil, it is treated with sulphuric acid before fractionation or its several fractions are individually purified by sulphuric acid treatment. In either case, the sulphuric acid treated material is neutralized and distilled in stills known as "pure" stills. In this distillation, there remains in the "pure" stills residues consisting largely of the dimers of coumarone and indene, together with higher coumarone-indene polymers and, as I have discovered, a substantial content of what I call "dimolar" compounds, the whole being contaminated with sulphurized compounds of coumarone and indene grouped generically under the term "sulphonates."

The above-described materials, as they are taken from the "pure" stills, have been used as plasticizers for natural rubber. For such use, their solvent power is not great, since they have an aniline point higher than that of pure coumarone and indene dimers, ranging fairly closely from about 31° C. to 34° C.

As a recent technical advance, processes have been invented and developed which convert the aliphatic or chain hydrocarbons into cyclic hydrocarbons, so that the aromatics benzol, toluol, and other cyclic products are obtained from petroleum oils. Processes of this general sort are disclosed in principle, and are illustrated by descriptions of specific exemplary operations in recent literature; as in the article "Catalytic dehydrogenation of monoolefins to diolefins" by Grosse, Morrell, and Mavitz, published in the March, 1940, issue of Industrial and Engineering Chemistry, vol. 32, No. 3, pages 309 to 311 inclusive, and in the article "Catalytic cyclization of aliphatic hydrocarbons to aromatics" by Grosse, Morrell, and Mattox, published in the April 1940 issue of Industrial and Engineering Chemistry, vol. 32, No. 4, pages 528 to 531 inclusive.

With this knowledge of cyclization and dehydrogenation, it has become possible to build mononuclear and polynuclear compounds containing the benzene ring, diolefins, hydro-aromatic and unsaturated hydro-aromatic hydrocarbons from aliphatic hydrocarbon materials derived from petroleum. The processes may be based, with or without the use of catalysts such as heat, acid clays, fullers' earth, anhydrous acid salts, or metallic oxides and the like, on either petroleum aliphatics or mixtures of aliphatic and aromatic hydrocarbons. The literature of this new art is scant but rapidly developing. Complete information is not public knowledge at this time.

In at least some variant examples of those processes, a circulating body of petroleum oil is subjected to the cyclizing treatment comprising a vapor phase cracking to form a content of olefins and diolefins, with or without an insertion into the system of a content of aromatic hydrocarbons such as benzol, toluol, and like aromatics. Diolefins of the nature of butadiene, together with the cyclic compounds benzol, toluol, xylol, styrene, methyl-styrene, coumarone, indene, trimethyl-benzene, their isomers, and other cyclic compounds are taken off as the circulation proceeds. As removed at the end of the process or during its continuance, the recirculating oil is composed of "dimolar" compounds together with dimers and higher polymers of "light oil" unsaturates, and unpolymerized "light oil" unsaturates and saturates.

Recirculating oils rich in "dimolar" compounds remain at the end of various processes performed on petroleum oils and which involve cracking, reforming, dehydrogenating, and cyclizing. One type of recirculating oils are known commercially as "Resolve" oils, which term embraces total, light, and overhead "Resolve" oils recovered as by-products in processes for producing isoprene, butadiene, and styrene, as well as from processes in which benzol, toluol, isopropyl benzene and the like are formed into aliphatics.

More particularly, the "Resolve" (recirculating solvent oils) oils to which I refer are those remaining from the catalytic cyclizing and dehydrogenation of aliphatic, and particularly olefinic hydrocarbons for producing conjugated unsaturated aromatics suitable for forming elastomers by polymerization. Those oils recovered as by-products contain the longer chain "light oil" unsaturates such as coumarone, indene, methyl-styrene, and styrene, as well as benzene ring compounds such as benzol, toluol, and xylol, cumene and trimethyl-benzene. Because of the dehydrogenating conditions under which they are produced, they are particularly rich in "dimolar" compounds formed from the aromatic compounds found in coke oven light oil. They also contain addition products of unsaturates such as indene, coumarone, and styrene with benzol, toluol, xylol, and high-flash solvent naphtha.

With the qualification that all the di-molecular substances which I have herein for convenience termed "dimolar" compounds are formed from compounds found in coke oven light oil, I may define them as compounds of the diphenyl series, and their alkyl and alkenyl substitution products, as well as like substitution products of aliphatics. Explanation of that definition is desirable. Taking diphenyl initially, that substance consists of two benzene rings joined, with elimination of hydrogen. Diphenyl thus may be represented by the formula $C_6H_5$—$C_6H_5$, or structurally as follows:

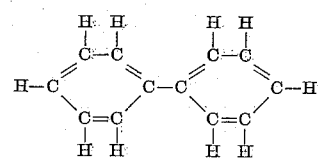

A similar arrangement is present in dibenzyl, which is two initial molecules of toluol $C_6H_5.CH_3$ linked with elimination of hydrogen in the manner structurally shown as:

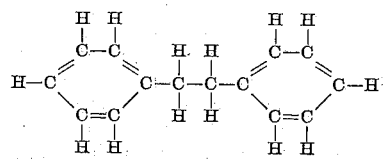

Dibenzyl thus may be considered as a phenyl substituted ethane.

The same arrangement as in diphenyl is present in ditolyl, which is two initial molecules of toluol C₆H₅.CH₃ linked with elimination of hydrogen, as:

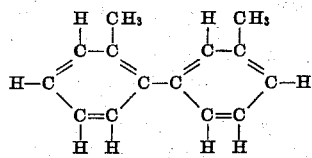

Other alkyl and alkenyl substitution products of diphenyl falling within the definition may be illustrated by the following structural formula, in which "R" is an alkyl or alkenyl substituted group:

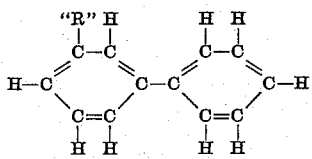

Taking phenyl-styrene as illustrative of the alkenyl substituted products, its formula may be written structurally as follows:

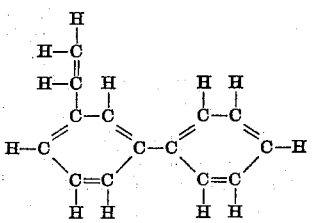

All of such compounds formed from the compounds found in coke oven light oil are found in recirculating oils from cyclizing processes and in the benzol, toluol, and xylol "pure" stills. Not all of them are usually present in any one of the designated high-boiling oils; but such oils all have a substantial content of at least one of the compounds of the group, and all the oils by virtue of a substantial content of such compound or compounds have a very low aniline point with respect to their relatively high boiling range. There are also formed and initially contained in these oils dimers of those unsaturates, together with some content of resins resulting from heat-polymerization and some content of unchanged cyclic aromatics such as benzol, toluol, xylol, high-flash solvent naphtha, coumarone, indene, and styrene.

The various phenyl compounds comprised in these oils all respond to the general formula:

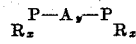

in which "P" is a phenyl group, "A" is an aliphatic group, "R" is an alkyl or alkenyl group, the subscript "$x$" is a number from zero up. Considering the several specific compounds given above, it will be seen that each of them responds to this general formula and "$y$" is a number including zero and unity.

As above noted, all the "Resolve" oils, from cyclizing processes are oils which are particularly high in "dimolar" compounds, consisting of the diphenyl series and its alkyl and alkenyl substitution products, phenyl-substituted aliphatics, and the like, formed from the compounds found in coke oven light oil. After removal of polymerizable unsaturates, chiefly represented by styrene, coumarone, and indene which would tend to render the oils unstable, together with unreacted benzene ring compounds such as benzol, toluol, and xylol by distillation, and after removal by further distillation of heat-polymers higher than dimers, there is obtained an oil which boils within the approximate range of 220° C. to 350° C. and over 90% within the range of 230° C. to 300° C., and which has an averaged aniline point of from about 20° C. to 22° C.

These last mentioned practices not only are relatively new, but in their details are not currently public knowledge. The above will, however, serve adequately to identify them.

It may be noted that in the recirculating oil there is seldom any remaining content of aliphatics boiling within the ranges of the "dimolar" compounds; and such content if present is not substantial, seldom exceeding 2% of the whole. Such oils consisting of less than 5% of aliphatics may justifiably be considered as essentially aromatic oils.

Considering the solvent power of such non-evaporative solvents for synthetic rubbers and other elastomers, it should be borne in mind that below an aniline point of about 25° C. each degree of decrease in aniline point represents great improvement in the properties of the elastomer which is plasticized. Thus an oil having an aniline point of 21° C. has a solvent power very much greater than that of an oil having an aniline point of 26° C.

It has been noted that the aniline point of pure coumarone-indene dimers is about 26° C. to 27° C., and the aniline point of still residue from the sulphuric acid purification and neutralization of complete "light oil," purified of sulphonates and freed of resin polymers higher than dimers and entrapped low boiling aromatics is about 25° C. That material, i. e., the purified and stripped "pure" still residue, has an aniline point lower than the aniline points of pure coumarone-indene dimers because of its content of "dimolar" compounds. It may be noted that a wholly satisfactory method of purifying "pure" still residues of sulphonates is to be found in United States Patent to Samuel G. Burroughs, No. 2,209,317.

Whole "pure" still residue from the purification of coke oven light oil, i. e. "light oil," does not yield an oil having an aniline point below 25° C. coupled with a boiling range from about 220° C. to 350° C. This apparently is because its content of crude heavy naphtha imparts to the whole still residue a high content of coumarone-indene dimers, which is not compensated by its content of aromatic "dimolars," or diphenyl series aromatics.

It is a currently increasing practice to purify the benzol, toluol, and xylol fractions separately. The residues from the "pure" stills in which those fractions are distilled following sulphuric acid treatment and neutralization largely contain the "dimolar" compounds appropriate to the fraction, together with dimers of indene and coumarone, appropriate addition products of the sort above noted, and homologous products. After being purified of sulphonates, and freed both of resin polymers higher than the dimers of coumarone and indene and of their low boiling content, the still residues from the purification of benzol, toluol, and xylol all have aniline points below 25° C.

Thus the aniline points of the high-boiling oils obtained from these still residues are:

The purified aromatic oil from the xylol "pure"

still residue has an aniline point of from 23° C. to 24° C.

The purified aromatic oil from the toluol "pure" still residue has an aniline point close to 22° C.

The purified aromatic oil from the benzol "pure" still residue has an aniline point close to 20° C.

The recirculating oils from cyclizing processes, freed of resin polymers higher than the dimers and their low boiling content, have aniline points from 18° C. to 22° C.

All these variantly derived oils are aromatic oils of the coke oven light oil, or "light oil," type, which boil over 200° C. They all boil within the approximate range of 220° C. to 350° C., and over 90% within the range of 230° C. to 300° C. It is to be understood that they all may be blended one with the other to give such conjunction of convenience and solvent power as may be desirable under the circumstances. They may be enriched in their "dimolar" content.

The sources of all these plasticizing oils are not only domestic but are also of such breadth as to give an abundant supply of the materials to meet any reasonably anticipated demand. Increasing demands for benzol and toluol as preferred yield from "light oil" lead to increased use of "pure" stills for purification of the benzol and toluol "light oil" fractions. Increasing use of synthetic rubbers of itself leads to increased production of recirculating solvent oils having the properties which I have found desirable. The oils from one of these sources require complicated and expensive preparatory treatments in order to render them suitable for their intended use.

These "light oil" type oils, whether they are by derivation the recirculating oils from cyclizing and dehydrogenating processes or still residues from the purification of benzol, toluol, and xylol fractions are similarly prepared for use. After a topping distillation, they are distilled carefully at as low a temperature as is possible in order to avoid cracking and in order to avoid carrying over any polymers higher than dimers. If the oils contain a substantial proportion of unreacted polymerizable unsaturates, as occurs more frequently in the "Resolve" oils, they desirably are first subjected to heat-polymerization of those unsaturates and are then subjected to careful distillation.

As of the date of which I speak none of the oils disclosed herein are well-known as to their composition or properties. The "Resolve" oils are in the nature of waste products, and prior to my inventions substantial use for them had not been found. The specific composition and properties of residues from the sulphuric acid purification of the benzol, toluol, and xylol "light oil" fractions had not been determined prior to my inventions, nor had there been exploration of uses to which the purified high-boiling residual oils from these fractions particularly are suited. In fact, where the purification of "light oil" fractions has been practiced it has been customary to run the still residues from all fractions into a common receptacle in which they mix as "pure" still residue.

I have found that when the synthetic rubbers are reclaimed with reclaiming oils of adequate solvent power containing substantial quantities of these aromatic oils having average aniline points below 25° C., the reclaimed stock is of the highest type, approaching very closely to worked new natural rubber stock in its properties. This is true in the reclaiming of synthetic rubbers both of the type composed of butadiene and acrylic-nitrile copolymers and of the type composed of butadiene and styrene copolymers. Analogously they are effective in softening and plasticizing such other elastomers as have the solvent characteristics of natural rubber and of those synthetic rubbers. This is because they are nonvolatile oils having plasticizing properties which possess also good solvent power.

These aromatic oils have ability of themselves to swell natural and synthetic reclaimed rubber stock, and have fair properties of penetration. Because, however, of the fact that they are nonvolatile oils of plasticizing sort, I have found it necessary to blend with them a suitable more volatile solvent having high properties of penetration. Such blend combines in novel order conjoint ability to penetrate and swell the reclaim stock and effectively to plasticize it. This results both in decreasing the time required for a reclaiming operation and produces a reclaim stock having the above indicated superior properties.

I have discovered that crude heavy (No. 2) solvent naphtha is the more volatile solvent suitably blended with the aromatic oil of high solvent power, to form the rubber-reclaiming oil of my invention. Crude heavy solvent naphtha is the "light oil" cut distilling off after xylol and before naphthalene. That material, considering it as containing only minor amounts of naphthalene, boils within the approximate range of 145° C. to 210° C. It varies in aniline point from about 20° C. to 30° C., and varies in its content of resin-forming unsaturates. A cut of the crude heavy solvent naphtha boiling within the approximate range of 165° C. to 185° C., which is the fraction containing the highest proportion of coumarone and indene, has an aniline point of about 20° C. to 22° C. This last is the cut of crude heavy solvent naphtha which is preferred as a component of my rubber-reclaiming oil.

In the operation of digesting the reclaim stock, I have found suitable a quantity of the blended reclaiming oil equal to from about 5% to 15% the weight of the stock, in reclaiming synthetic rubber composed of the copolymers of butadiene and styrene. A proportion of the reclaiming oil equal to about 15% to 25% the weight of the reclaim stock is suitable if a synthetic rubber composed of the copolymers of butadiene and acrylic-nitrile is subjected to reclamation. In the case of natural rubber I have found a quantity of the reclaiming oil equal to about 2% to 5% the weight of the rubber to be suitable. In reclaiming other elastomeric bodies, a quantity of the reclaiming oil based upon comparison with natural rubber and the named synthetic rubbers suitably is used. Such comparison roughly may be made in accordance with the polymer size of each such other elastomer.

Naturally, those exemplifications of my reclaiming oil which have lower aniline points greatly shorten the time required for the digestion of the reclaim stock under similar conditions of temperature and pressure. Also the lower the aniline point of the blend and particularly the lower the aniline point of the relatively nonvolatile aromatic oil content of the blend may be, the more effective will those plasticizing oils be in penetrating and in dispersing and softening the elastomeric reclaim stock.

Assuming that a pressure of about 200 pounds is employed in the digester a relatively great quantity of the reclaiming oil penetrates the stock. Upon release of pressure, and when the stock is worked in sheet mills at a temperature in the neighborhood of 240° F. most of the more volatile crude solvent naphtha escapes. Sufficient of the less volatile aromatic oil is, however, retained in the stock to plasticize the stock and to render it sufficiently soft and pliable during and after working. Because of the relatively high solvent power of that content of the reclaiming oil, it is more uniformly and effectively distributed throughout the body of the elastomer than are other rubber plasticizers possessing solvent power of lower order.

The relative proportion of the relatively non-volatile aromatic oil and the relatively more volatile crude solvent naphtha included in the reclaiming oil may be varied widely, in order to provide blends more suitable under various circumstances and conditions. One condition which influences such proportioning is the time element, that is the desirability of shortening the working time for the stock. Another condition is the duration and effectiveness of the digesting step of the reclaiming process. If the digesting step be short or relatively ineffective, so that penetration of the stock by the reclaiming oil is relatively imperfect, it is desirable to compensate that condition by including an increased proportion of the relatively non-volatile aromatic oil mechanically to be worked into the stock. The proportioning of the components in the blend of the reclaiming oil thus may be used in measure to compensate for deviation in preferred practice in the reclaiming process.

The porportions of the relatively non-volatile aromatic oil and of the relatively volatile crude solvent naphtha in the blended reclaiming oil also will vary in accordance with the aniline point of each, and in accordance with the resistance of the stock being reclaimed to penetration and swelling and in requirement for a plasticizer, having regard as above noted to the effectiveness of the digesting step of the reclaiming process and the time during which the digested stock is worked. In any event the relatively more volatile and more penetrative crude solvent naphtha is included in substantial quantity adequate to give the blend penetrative properties substantially greater than possessed by the relatively less volatile and less penetrative high-boiling aromatic oil taken by itself. In any event the relatively more permanent plasticizing oil is included in the blend in substantial quantity adequate to give the blend plasticizing properties substantially greater than possessed by the relatively more fugitive crude solvent naphtha taken by itself. Normally the relative proportions of the components, in parts by weight, are varied within the approximate limits of 20 % to 80% of the crude solvent naphtha and 20% to 80% of the high-boiling aromatic oil.

In any event I include in the blend aromatic oils having an average aniline point below 25° C.; and prefer to include those having an average aniline point below 22° C. I prefer to use crude solvent naphtha of such aniline point and the higher-boiling aromatic oils of such average aniline point, so proportioned in the blend, that the blended reclaiming oil has an aniline point below 25° C., and even better an aniline point below 22° C.

The term "elastomer" has been used freely herein to designate generically all synthetic rubbers and rubber-like plastics. There is literature authority for so doing in the article "Synthetic rubber" by Fisher in the issue of Industrial and Engineering Chemistry for August 1939, vol. 31, No. 8, pages 941 to 945, inclusive, and in an article by Frederick Marchionna in the issue of the Rubber Age for June 1942, vol. 51, No. 3, pages 209 to 211, inclusive. These authors concur in the desirability of establishing the term "elastomer" as embracing the elastoprenes, or ring type chloroprenes (such as "neoprene"), the elastolenes, such as butadiene polymers and copolymers, the elastothiomers, or organic polysulphides ("Thiokol", etc.), and the elastoplastics, such as high-polymer molding materials. My reclaiming oil may be used in reclaiming any of these elastomers.

Since aniline point is made a determining factor in defining my invention and since methods of aniline point determination themselves vary, I shall give the following procedure which is standardized and checks very closely in its determination, this procedure having been used in making all the aniline point determinations given above.

*Standard aniline point method*

In making an aniline point determination, I redistill purified aniline, rejecting the first 10% and the last 5% of the distillate. I have for use with this distilled aniline, petroleum naphtha of the grade known commercially as Stoddard solvent boiling chiefly between 150° C. and 200° C., which petroleum naphtha has previously been standardized against aniline by the method which follows to have an aniline point of 60° C. plus or minus 1° C.

In proceeding, I pipette 5 cc. of the material for determination into a French square bottle and pipette 5 cc. of the Stoddard solvent having an aniline point of 60° C. into the same bottle. I stopper and shake the bottle. I then pipette 2½ cc. of the mixture into a 25 x 100 mm. test tube, and 5 cc. of the freshly distilled aniline is also pipetted into the same tube. The test tube is stoppered with a cork containing a thermometer of suitable range in such manner that the bulb of the thermometer extends centrally into the mixture in the test tube. This final mixture is warmed gently until complete miscibility is reached, and is then cooled at the rate of 2° C. per minute. An observation of the temperature at which the first sign of cloudiness appears in the mixture gives an aniline point for the material, the aniline point of which is to be determined. I have found that this method is accurate within .2 of one degree centigrade.

Boiling ranges as given in the foregoing specification are all determined by straight distillation without the use of steam or vacuum. Where percentages are given without qualification, it is to be understood that they represent proportions based upon parts by weight. Where ranges are given without qualification, they are to be taken as "inclusive." Numerous changes from the exemplifications of my invention as above given may be made without going beyond the scope of the invention as defined by the appended claims.

I claim as my invention:

1. In reclaiming a synthetic rubber selected from the synthetic rubbers composed of the rubbery copolymers of butadiene and acrylic nitrile and the synthetic rubbers composed of the rubbery copolymers of butadiene and styrene the step of digesting the said synthetic rubber by subjecting the synthetic rubber in divided condition to heat and pressure in the presence of from 5% to 25% its weight of a reclaiming oil composed of crude heavy solvent naphtha boiling, within the approximate range of 165° C. to 185° C., and an aromatic oil formed from compounds found in coke oven light oil and boiling within the approximate range of 220° C. to 350° C. which has an aniline point below 25° C. by virtue of a substantial content of at least one compound responding to the formula

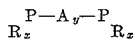

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

2. In reclaiming a synthetic rubber selected from the synthetic rubbers composed of the rubbery copolymers of butadiene and acrylic nitrile and the synthetic rubbers composed of the rubbery copolymers of butadiene and styrene the step of digesting the said synthetic rubber by subjecting the synthetic rubber in divided condition to heat and pressure in the presence of from 5% to 25% its weight of a reclaiming oil composed of crude heavy solvent naphtha boiling within the approximate range of 145° C. to 210° C. and an aromatic oil formed from compounds found in coke oven light oil boiling within the approximate range of 220° C. to 350° C. which has an aniline point below 22° C. by virtue of a substantial content of at least one compound responding to the formula

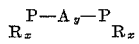

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

3. In reclaiming a synthetic rubber selected from the synthetic rubbers composed of the rubbery copolymers of butadiene and acrylic nitrile and the synthetic rubbers composed of the rubbery copolymers of butadiene and styrene the step of digesting the said synthetic rubber by subjecting the synthetic rubber in divided condition to heat and pressure in the presence of from 5% to 25% its weight of a reclaiming oil composed of crude heavy solvent naphtha boiling within the approximate range of 165° C. to 185° C., and an aromatic oil formed from compounds found in coke oven light oil and boiling within the approximate range of 220° C. to 350° C. which has an aniline point below 22° C. by virtue of a substantial content of at least one compound of the group responding to the formula

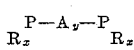

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

4. In reclaiming a synthetic rubber selected from the synthetic rubbers composed of the rubbery copolymers of butadiene and acrylic nitrile and the synthetic rubbers composed of the rubbery copolymers of butadiene and styrene the step of digesting the said synthetic rubber by subjecting the synthetic rubber in divided condition to heat and pressure in the presence of from 5% to 25% its weight of a reclaiming oil composed of crude heavy solvent naphtha boiling within the approximate range of 145° C. to 210° C. and an aromatic oil formed from compounds found in coke oven light oil boiling within the approximate range of 220° C. to 350° C. which has an aniline point below 25° C. by virtue of a substantial content of at least one compound responding to the formula

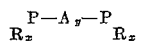

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

5. In reclaiming a butadiene acrylic nitrile synthetic rubber the step of digesting the said synthetic rubber by subjecting the synthetic rubber in divided condition to heat and pressure in the presence of from 15% to 25% its weight of a reclaiming oil composed of crude heavy solvent naphtha boiling within the approximate range of 165° C. to 185° C., and an aromatic oil formed from compounds in coke oven light oil and boiling within the approximate range of 220° C. to 350° C. which has an aniline point below 25° C. by virtue of a substantial content of at least one compound responding to the formula

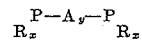

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

6. In reclaiming a butadiene acrylic nitrile synthetic rubber the step of digesting the said synthetic rubber by subjecting the synthetic rubber in divided condition to heat and pressure in the presence of from 15% to 25% its weight of a reclaiming oil composed of crude heavy solvent naphtha boiling within the approximate range of 145° C. to 210° C. and an aromatic oil formed from compounds found in coke oven light oil boiling within the approximate range of 220° C. to 350° C. which has an aniline point below 22° C. by virtue of a substantial content of at least one compound responding to the formula

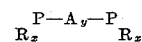

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

7. In reclaiming a butadiene acrylic nitrile synthetic rubber the step of digesting the said synthetic rubber by subjecting the synthetic rubber in divided condition to heat and pressure in the presence of from 15% to 25% its weight of a reclaiming oil composed of crude heavy solvent naphtha boiling within the approximate range of 165° C. to 185° C., and an aromatic oil formed from compounds found in coke oven light oil and boiling within the approximate range of 220° C. to 350° C. which has an aniline point below 22° C. by virtue of a substantial content of at least one compound of the group responding to the formula

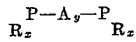

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

8. In reclaiming a butadiene acrylic nitrile synthetic rubber the step of digesting the said synthetic rubber by subjecting the synthetic rubber in divided condition to heat and pressure in the presence of from 15% to 25% its weight of a reclaiming oil composed of crude heavy solvent naphtha boiling within the approximate range of 145° C. to 210° C. and an aromatic oil formed from compounds found in coke oven light oil boiling within the approximate range of 220° C. to 350° C. which has an aniline point below 25° C. by virtue of a substantial content of at least one compound responding to the formula

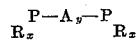

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

9. In reclaiming a synthetic rubber composed of copolymers of butadiene and styrene the step of digesting the said synthetic rubber by subjecting the synthetic rubber in divided condition to heat and pressure in the presence of from 5% to 15% its weight of a reclaiming oil composed of crude heavy solvent naphtha boiling within the approximate range of 165° C. to 185° C., and an aromatic oil formed from compounds found in coke oven light oil and boiling within the approximate range of 220° C. to 350° C. which has an aniline point below 25° C. by virtue of a substantial content of at least one compound responding to the formula

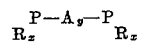

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

10. In reclaiming a synthetic rubber composed of copolymers of butadiene and styrene the step of digesting the said synthetic rubber by subjecting the synthetic rubber in divided condition to heat and pressure in the presence of from 5% to 15% its weight of a reclaiming oil composed of crude heavy solvent naphtha boiling within the approximate range of 145° C. to 210° C. and an aromatic oil formed from compounds found in coke oven light oil boiling within the approximate range of 220° C. to 350° C. which has an aniline point below 22° C. by virtue of a substantial content of at least one compound responding to the formula

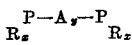

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

11. In reclaiming a synthetic rubber composed of copolymers of butadiene and styrene the step of digesting the said synthetic rubber by subjecting the synthetic rubber in divided condition to heat and pressure in the presence of from 5% to 15% its weight of a reclaiming oil composed of crude heavy solvent naphtha boiling within the approximate range of 165° C. to 185° C., and an aromatic oil formed from compounds found in coke oven light oil and boiling within the approximate range of 220° C. to 350° C. which has an aniline point below 22° C. by virtue of a substantial content of at least one compound of the group responding to the formula

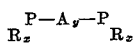

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

12. In reclaiming a synthetic rubber composed of copolymers of butadiene and styrene the step of digesting the said synthetic rubber by subjecting the synthetic rubber in divided condition to heat and pressure in the presence of from 5% to 15% its weight of a reclaiming oil composed of crude heavy solvent naphtha boiling within the approximate range of 145° C. to 210° C. and an aromatic oil formed from compounds found in coke oven light oil boiling within the approximate range of 220° C. to 350° C. which has an aniline point below 25° C. by virtue of a substantial content of at least one compound responding to the formula

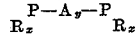

in which "P" is a phenyl group, "A" is an aliphatic group, "R" is selected from the group consisting of alkyl and alkenyl groups, "$x$" is a number up to unity and "$y$" is a number up to unity, the said crude heavy solvent naphtha and the said higher boiling aromatic oil being included in the proportion of 20% to 80% of the said crude solvent naphtha and 20% to 80% of the said higher boiling aromatic oil.

FRANK W. CORKERY.

REFERENCES CITED

The following references are of record in the file of this patent:

UNITED STATES PATENTS

| Number | Name | Date |
|---|---|---|
| 1,625,415 | Lilienfeld | Apr. 19, 1927 |
| 2,128,985 | Carmody | Sept. 6, 1938 |
| 2,149,577 | Carmody | Mar. 7, 1939 |
| 2,153,141 | Engel | Apr. 4, 1939 |
| 2,207,552 | Putt | July 9, 1940 |
| 2,215,383 | Warner | Sept. 17, 1940 |
| 2,282,327 | Dreisbach | May 12, 1942 |
| 2,285,562 | Britton et al. | June 9, 1942 |
| 2,324,980 | Kilbourne | July 20, 1943 |
| 2,342,090 | Sachanen et al. | Feb. 15, 1944 |
| 2,373,982 | Sturrock et al. | Apr. 17, 1945 |

FOREIGN PATENTS

| Number | Country | Date |
|---|---|---|
| 639,354 | Germany | Dec. 3, 1936 |

Certificate of Correction

September 21, 1948.

Patent No. 2,449,879.

FRANK W. CORKERY

It is hereby certified that error appears in the printed specification of the above numbered patent requiring correction as follows:

Column 7, line 33, for the words "from one" read *from none*; and that the said Letters Patent should be read with this correction therein that the same may conform to the record of the case in the Patent Office.

Signed and sealed this 3rd day of May, A. D. 1949.

[SEAL]

THOMAS F. MURPHY,
*Assistant Commissioner of Patents.*